United States Patent Office 3,658,909
Patented Apr. 25, 1972

3,658,909
COMPOSITIONS CONTAINING SUBSTITUTED
3-MERCAPTOCYCLOHEXANONES
Roger P. Napier, Piscataway, N.J., assignor to
Mobil Oil Corporation
No Drawing. Filed Aug. 26, 1968, Ser. No. 755,389
Int. Cl. C07c 49/30
U.S. Cl. 260—590    5 Claims

ABSTRACT OF THE DISCLOSURE 3-(substituted arylthio) cyclohexanones are new compounds useful as fungicides. Some are effective against plant fungi, while others are effective against soil fungi. Some are effective against both types.

BACKGROUND OF THE INVENTION

Field of the invention

This invention relates to new compositions having utility as fungicides. It is particularly concerned with fungicidal compositions containing substituted 3-mercaptocyclohexanones.

Description of the prior art

In spite of the enormous amount of work that has been done on the protection of plants from attack by harmful fungi, there are still relatively few good fungicides available. One reason for this is that fungi themselves are low order plants, being similar in many properties, reactions, and responses to the host plant. Thus, materials applied to destroy fungi are sometimes likely to injure the host plant. There are also soil-borne fungi that affect plant growth. Control of such fungi is also complicated by the effect upon the desirable plants. Insofar as is now known, the substituted 3-thiocyclohexanones described herein have not been proposed for combatting fungi.

SUMMARY OF THE INVENTION

This invention provides agricultural fungicidal compounds having the formula:

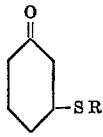

wherein R is phenyl or benzothienyl or other suitable heterocyclics which can have one or more ring substituents selected from the group consisting of halogen, hydroxy, mercapto, nitro, formyl, alkyl ($C_1$–$C_5$), cycloalkyl, alkoxy ($C_1$–$C_5$), alkylthio ($C_1$–$C_5$), and —NR'R", wherein R' and R" are selected from the group consisting of hydrogen and alkyl ($C_1$–$C_5$). It also provides agricultural fungicidal compositions comprising of at least one of the aforedefined compounds and a carrier therefor and a method for combatting fungi which comprises contacting the fungi with at least one of the aforedefined compounds.

DESCRIPTION OF THE SPECIFIC EMBODIMENTS

The 3-arylthiocyclohexanone fungicides of this invention are readily prepared by reacting a thiophenol (aryl mercaptan) or a ring-substituted derivative with 2-cyclohexen-1-one in the presence of an amine catalyst having a pKb higher than $4 \times 10^{-10}$, such as triethylamine, tripropylamine, and tributylamine. It is preferred to use a suitable solvent, e.g., liquid aromatic hydrocarbons, such as benzene, toluene, xylene, and hydrocarbon mixtures containing them and halogenated hydrocarbons, such as chloroform. Acetone, ethanol, methanol, and dioxane can also be used.

The reaction is usually carried out at temperatures between about 25° C. and about 80° C. for between about 1 hour and about 2 hours. In general, this is an exothermic reaction.

The following example illustrates a typical procedure for preparing compounds of this invention.

EXAMPLE p-Bromothiophenol (19.0 g., 0.1 mole) was dissolved in 250 ml. of benzene. Triethylamine (10.0 g., 0.1 mole) was then added slowly with stirring. A solution of 10.0 g. (0.104 mole) of 2-cyclohexen-1-one in 50 ml. of benzene was added drop-wise with stirring at a rate that 35° C. is not exceeded. After stirring for 1 hour, the solution was heated on a steam bath for 0.5 hour, cooled, and the solvent removed by distillation. The residue was taken up in chloroform, washed with 2% sodium hydroxide and then with water. The solution was dried over anhydrous magnesium sulfate and stripped to give 26.5 g. (93% yield) of an oil which crystallized on standing; M.P. 74–75° C. The infrared spectrum of the solid, 3-(p-bromophenylthio)-cyclohexanone, showed the expected carbonyl absorption at 1720 cm.$^{-1}$.

Analysis.—Theory (percent): C, 50.56; H, 4.56; S, 11.23. Found (percent): C, 50.43; H, 4.44; S, 11.40.

Non-limiting examples of other compounds that are within the scope and contemplation of this invention are:

3-(phenylthio)cyclohexanone;
3-(p-tertiary-butylphenylthio)cyclohexanone;
3-(o-isopropylphenylthio)cyclohexanone;
3-(2-methyl-4-tertiarybutylphenylthio)cyclohexanone;
3-(p-methoxyphenylthio)cyclohexanone;
3-(p-methylphenylthio)cyclohexanone;
3-(p-aminophenylthio)cyclohexanone;
3-(p-ethylaminophenylthio)cyclohexanone;
3-(4-benzo(b)thienylthio)cyclohexanone;
3-(4-pyridylthio)cyclohexanone;
3-(2-formylphenylthio)cyclohexanone;
3-(p-chlorophenylthio)cyclohexanone;
3-(2,3,5,6-tetrafluorophenylthio)cyclohexanone;
3-(p-bromophenylthio)cyclohexanone;
3-(4-bromo-3-methylphenylthio)cyclohexanone;
3-(p-fluorophenylthio)cyclohexanone;
3-(3,4-dichlorophenylthio)cyclohexanone;
3-(o-hydroxyphenylthio)cyclohexanone;
3-(o-mercaptophenylthio)cyclohexanone; and
3-(p-nitrophenylthio)cyclohexanone.

These compounds have been found to be effective agricultural fungicides. Some are effective against plant fungi and others are effective against soil fungi. Some, however, have been found effective against both plant and soil fungi. The 3-mercaptocyclohexanone derivatives contemplated herein are applied as the toxic components in fungicidal compositions of at least one derivative and a carrier. In order to achieve a broader spectrum of control, it is within the contemplation of this invention to include two or more of these compounds in the fungicidal composition.

The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the fungicidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the contemplated 3-mercaptocyclohexanone derivatives used in the fungicidal compositions will vary rather widely. It depends to some extent upon the type of composition in which the material is being used, the nature of the condition to be controlled, and the method of application. In the ultimate fungicidal composition, as applied in the field, fungicide concentrations as low as 0.0001 weight percent of the total composition can be used. In general, compositions, as applied, containing about 0.005 weight percent (50 p.p.m.) fungicide in either liquid or solid carrier, give good results. In some cases, however, stronger dosages up to about one weight percent may be required.

In practice, fungicidal compositions are usually prepared in the form of concentrates, which are diluted in the field to the concentration desired for application. For example, the concentrate can be a wettable powder containing large amounts of fungicide, a carrier (e.g., attapulgite or other clay), and wetting and dispersing agents. Such powders can be diluted prior to application by dispersing it in water to obtain a sprayable suspension containing the concentration of fungicide desired for application. Other concentrates can be solutions that can be later diluted, e.g., with kerosene. Thus, it is within the contemplation of this invention to provide fungicidal compositions containing up to about 80 percent, by weight of the composition, of fungicide. Accordingly, depending upon whether it is ready for application or it is in concentrated form, the contemplated fungicidal compositions contain between about 0.0001 percent and about 80 percent, by weight of the composition of at least one fungicidal 3-mercaptocyclohexanone derivative and a carrier, liquid or solid, as defined hereinbefore.

The fungicides are tested for effectiveness against plant fungi and soil fungi by the following procedures:

FUNGICIDE SCREENING METHODS

Contact screening method (A) DEPRESSION SLIDE (SPORE GERMINATION) TEST

Compounds are screened at 50 p.p.m. against *monilinia fructicola* and *Stemphylium sarcinaeforme* and if desired are screened at 10 p.p.m. against all five organisms shown below.

Method of culturing the test organisms

Fungus species *Monilinia fructicola*, *Stemphylium sarcinaeforme*, *Alternaria oleracea*, *Phytophthora capsici* and *Puccinia graminis tritici* are cultured on potato dextrose agar, oat agar, potato dextrose agar, malt agar, and wheat plants, respectively, at room temperature under continuous fluorescent light. Spores growing in 90 mm. petri dishes containing 40 ml. of the respective agar medium or on the wheat host (for *P. Graminis tritici*) are ready for the tests after one week.

Method of treatment

Spores are obtained by scraping them from the surface of the cultures with a rubber policeman or bacterial loop and washing them free with distilled water. The spores in suspension are filtered through a thin layer of glass wool to remove bits of mycelium, and freed of soluble extraneous materials by centrifuging and resuspending the distilled water. The spore concentration is adjusted to 10,000 per ml., using a Fuchs-Rosenthal counting chamber.

Washing spores (as described above) eliminates water-soluble agents which might affect germination. However, washed spores of some fungi will not germinate readily in distilled water. A spore germination stimulant of ultra filtered orange juice is prepared by filtering fresh orange juice through cheesecloth and then through fine filter paper. The filtrate is diluted with distilled water to give a 10 percent solution. Five-ml. portions are placed in 2-dram, screw-capped vials and stored in the freezer until needed. When needed, the 10 percent solution is again diluted 1:9 and added to the spore solution in equal amounts, giving a stimulant concentration of 0.5 percent.

One hundred mg. of each test compound is weighed into a 4-dram wide-mouth vial and dissolved in 10 ml. of a volatile solvent (usually acetone) giving a 10,000 p.p.m. concentration. A 50 p.p.m. concentration is prepared by serial dilution.

Two-tenths ml. of the 50 p.p.m. solution is placed in the well of a hollow-ground depression slide. One slide is prepared for each fungus organism. The volatile solvent is allowed to evaporate (15 minutes for acetone) leaving a deposit of the toxicant. Two-tenths ml. of the spore suspension-stimulant mixture is then added to each slide. Slides are placed in large, inverted glass moisture chambers on metal holding racks and the chambers are sealed with water to maintain a high relative humidity of near 100 percent. Chambers are held at constant room temperature near 24° C.

Method for recording results

After 16 hours, results are taken by counting the number of spores germinating per 50 spores from each of the two slides treated with the compound. The number failing to germinate is recorded as percent spore germination inhibition.

SOIL SCREENING METHOD (A) PAPER CUP DRENCH METHOD (PRIMARY)

Method of culturing test organisms

Four representative soil fungi *Fusarium oxysporium*, *Pythium debaryanum*, *Rhizoctonia solani* and *Sclerotium rolfsii* are maintained on potato dextrose agar, in 20 x 150 mm. test tubes. Inoculum for the tests is increased in 1000 ml. Erlenmeyer flask on a ¼ corn meal–¾ sand mixture (by volume). The medium is saturated with water and sterilized by autoclaving at 15 pounds pressure for 20 minutes on two successive days. The medium is inoculated by transferring, aseptically a small portion of mycelium for the test tube cultures 14 days prior to using inoculum.

Method of treatment (50 p.p.m. based on the weight of the soil)

An inoculated medium for each of the four soil organisms is prepared as follows: a 14 day old 1000 ml. flask of the corn meal-sand inoculum is used to inoculate 20 ten oz. cups of sterile soil by blending the inoculum and sterile sand for 10 minutes.

The inoculated medium is then placed in 10 oz. wax treated cold drink cups (20 cups of each organism) and treated as follows: a 150 mg. quantity of each candidate fungicide is weighed on the analytical balance and formulated using 10 ml. of acetone and 190 ml. of $H_2O$. A 50 ml. quantity of each chemical formulation is used to drench, one cup inoculated with each of the four fungal organisms. Immediately after the cups are drenched, they are placed in polyethylene bags (1 cup per bag) and held at 70° F. for 14 days.

Method of recording results

After 10 days, each cup is examined for the presence of fungal growth and each compound is rated for the percent inhibition of fungal growth.

Mercaptocyclohexanone derivatives falling within the scope of those contemplated in this invention were tested by the aforedescribed procedures. The test results (percent effectiveness) are set forth in the following table. In the table, the following abbreviations are used to identify the fungi species used.

FO—*Fusarium oxysporium*
PD—*Pythium debaryanum*
RS—*Rhizoctonia solani*
SR—*Sclerotium rolfsii*
MF—*Monilinia fructicola*

SS—*Stemphylium sarcinaeforme*
AO—*Alternaria oleracea*
PG—*Puccinia graminis*
PC—*Phytophthora capsici*

| R | Percent control | | | | | | | | | | |
|---|---|---|---|---|---|---|---|---|---|---|---|
| | 50 p.p.m. | | | | 50 p.p.m. | | 10 p.p.m. | | | | |
| | FO | PD | RS | SR | MF | SS | MF | SS | AO | PC | PG |
| —S—C$_6$H$_4$—Cl | 90 | 70 | 70 | 100 | 100 | 90 | 100 | 60 | 100 | 0 | — |
| —S—C$_6$H$_4$—Br | | | | | 100 | 100 | | | | | |
| —S—C$_6$H$_4$—F | | | | | 100 | 100 | 0 | 30 | | | |
| —S—C$_6$H$_3$(CH$_3$)—Br | | | | | 100 | 100 | 100 | 90 | | 90 | |
| —S—C$_6$H$_4$—NO$_2$ | 100 | 100 | 0 | 100 | 100 | 100 | 0 | 20 | | 0 | 40 |
| —S—C$_6$H$_4$—H | | | | | 100 | 70 | | | | | |
| —S—C$_6$H$_4$—NH$_2$ | | | | | 70 | 50 | | | | | |
| —S—C$_6$H$_4$—OCH$_3$ | | | | | 100 | 80 | | | | | |
| —S—C$_6$H$_4$—C(CH$_3$)$_3$ | | | | | 100 | 70 | | | | | |
| —S—C$_6$F$_4$—H | | | | | 100 | 100 | | | | | |
| —S—benzothiophene | | | | | 100 | 80 | 0 | 50 | | 0 | 40 |
| —S—C$_6$H$_4$—OH | | | | | 100 | 100 | | | | | |
| —S—C$_6$H$_4$—CH(CH$_3$)$_2$ | | | | | 100 | 90 | 0 | 0 | | 0 | |
| —S—C$_6$H$_3$(CH$_3$)—C(CH$_3$)$_3$ | | | | | 100 | 80 | 0 | 30 | | 0 | |

Although the present invention has been described with preferred embodiments, it is to be understood that modifications and variations may be resorted, to without departing from the spirit and scope of this invention, as those skilled in the art will readily understand. Such variations and modifications are considered to be within the purview and scope of the appended claims.

What is claimed is:

1. Agricultural fungicidal compositions having the formula:

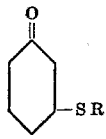

wherein R is phenyl which can have one or more ring substituents selected from the group consisting of halogen, hydroxy, mercapto, nitro, formyl, alkyl ($C_1$–$C_5$), alkoxy ($C_1$–$C_5$), and alkylthio ($C_1$–$C_5$).

2. A compound of claim 1, wherein R is p-chlorophenyl.

3. A compound of claim 1, wherein R is 4-bromo-3-methylphenyl.

4. A compound of claim 1, wherein R is p-nitrophenyl.

5. A compound of claim 1, wherein R is o-hydroxyphenyl.

References Cited

Kuehne: Chem. Abstracts, 59, 6292$^c$ (1963).

DANIEL D. HORWITZ, Primary Examiner

U.S. Cl. X.R.

260—294.8 C, 330.5, 577, 578; 424—275, 331